United States Patent [19]

Le Boucher et al.

[11] Patent Number: 5,415,529
[45] Date of Patent: May 16, 1995

[54] LINEAR-INDUCTION ELECTROMAGNETIC MACHINE WITH OPTIMIZED MAGNETIC FLUX DISTRIBUTION AND USE

[75] Inventors: Laurent Le Boucher, La Tronche; Dominique Villani, Saint Laurent de Mure; Philippe Marty, Uriage, all of France

[73] Assignee: Framatome, France

[21] Appl. No.: 158,883

[22] Filed: Nov. 29, 1993

[30] Foreign Application Priority Data

Nov. 30, 1992 [FR] France .................... 92 14405

[51] Int. Cl.6 .................................... H02K 44/06
[52] U.S. Cl. ................................ 417/50; 310/11
[58] Field of Search ....................... 417/50; 310/11

[56] References Cited

U.S. PATENT DOCUMENTS

| 2,698,127 | 12/1954 | Bowlus | 417/50 |
| 2,920,571 | 1/1960 | Fenemore et al. | 417/50 |
| 2,985,106 | 5/1961 | Rhudy | 417/50 |
| 3,147,711 | 9/1964 | Blake | 417/50 |

FOREIGN PATENT DOCUMENTS

| 764834 | 5/1934 | France . | |
| 1593007 | 7/1970 | France . | |
| 2082393 | 12/1971 | France . | |
| 1908457 | 8/1970 | Germany . | |
| 4029443 | 5/1991 | Germany . | |
| 699925 | 11/1953 | United Kingdom | 417/50 |
| 802043 | 9/1958 | United Kingdom | 417/50 |
| 2064229 | 6/1981 | United Kingdom . | |
| 1223817 | 8/1991 | U.S.S.R. | 417/50 |

*Primary Examiner*—Richard A. Bertsch
*Assistant Examiner*—Roland G. McAndrews, Jr.
*Attorney, Agent, or Firm*—Pollock, Vande Sande & Priddy

[57] ABSTRACT

The electromagnetic machine (1) includes a tubular duct (3) intended to receive a conducting material which can circulate in the duct (3) around the core (4) and an inductor (2) arranged coaxially around the duct (3). The inductor (2) includes a magnetic circuit (15) formed by laminated sheet metal combs (18) and windings (14) arranged in annular notches (5) made in the magnetic circuit (15). The notches (5) are separated from each other by teeth. The teeth of the inductor have lengths in the axial direction which are smaller in the central part of the inductor (2) than in the end parts. The notches (5) are less deep at the ends than in the central part and enclose windings having a smaller number of turns. The windings (14) are each connected to one phase of a polyphase current source.

5 Claims, 3 Drawing Sheets

LINEAR-INDUCTION ELECTROMAGNETIC MACHINE WITH OPTIMIZED MAGNETIC FLUX DISTRIBUTION AND USE

FIELD OF THE INVENTION

The invention relates to a linear-induction electromagnetic machine whose flux distribution in the axial direction of the inductor is optimized.

BACKGROUND OF THE INVENTION

Electromagnetic machines, such as pumps intended to circulate a conducting liquid material, devices for braking the circulation of a conducting liquid in a duct, linear motors or alternatively magnetohydrodynamic (MHD) generators, which include a straight tubular duct intended to receive a conducting material which can circulate in the duct, and an inductor arranged coaxially around the duct, are known.

The inductor generally includes a magnetic circuit formed by magnetic sheet metal combs forming annular notches coaxial with the duct, in each of which notches an annular winding, coaxial with the duct, is arranged.

The notches of the combs of the inductor of the electromagnetic machines of known type, in which the windings are arranged, are separated by parts, called teeth, which project radially inward.

The windings, which are distributed along the axial direction of the electromagnetic machine, are each connected to one phase of a polyphase current source, so that the inductor creates a field sliding in the axial direction, along the tubular duct.

Induced currents are thus created in the conducting material inside the duct, so that the material is circulated in the axial sense, by the combined effect of the induced currents and the sliding magnetic field of the inductor. In order to facilitate closure of the field lines inside the tubular duct, in particular in the case when the electromagnetic machine is used as a pump, it is proposed to place a magnetic core in a concentric arrangement inside the duct.

Such a pump can be used in particular for circulating a liquid metal, such as sodium, used as a heat-exchange fluid in fast-neutron nuclear reactors.

In such pumps, and more generally in the case of electromagnetic machines, whatever their use, it is desired to increase the efficiency of the machine, i.e., for example, in the case of a pump, the ratio of the hydraulic power to the electrical power consumed by the pump.

In the case of linear-induction electromagnetic pumps which are known and used, this efficiency is always substantially less than 50%.

Electromagnetic machines are also known, such as pumps including a duct of flat shape, for example with a rectangular cross-section, and a flat inductor including straight and mutually parallel notches which are separated by straight teeth. The inductor is placed parallel and facing one of the large plane faces of the duct, so that the teeth point towards the duct.

In the linear-induction electromagnetic machines of known the, the teeth of the inductor are all the same length and are regularly distributed in the axial direction.

The distance between the successive windings of the inductor is therefore constant.

Furthermore, the successive windings of the inductor are generally identical and all produce the same number of amps/turn.

As indicated above, the efficiency of such an electromagnetic machine used as a pump is substantially less than 50%, and generally close to 40%.

In order to increase the efficiency of linear-induction electromagnetic pumps, such as pumps used for circulating liquid sodium in fast-neutron nuclear reactors, various solutions are proposed which make it possible to vary either the speed of circulation of the fluid in the axial direction, or alternatively the distribution of the magnetic flux.

It has for example been proposed to use a duct having conical parts so as to vary the passage cross-section and therefore the speed of the fluid in the axial direction of the inductor corresponding to the direction of circulation of the fluid.

Producing such conical parts on the fluid circulation duct raises difficulties in design and manufacture of the duct.

It has also been proposed to produce a linear-induction electromagnetic pump whose inductor has an additional pole at one of its ends, consisting of a longer additional tooth, or of an extension of the last tooth of an inductor of standard type.

Although such a pump makes it possible to achieve an efficiency of close to 50%, this solution cannot be adopted generally, insofar as it has the drawback of increasing the bulk and the mass of the pump. In the case of pumps intended for conveying the liquid sodium of fast-neutron nuclear reactors with a very high hourly throughput, for example of the order of 600 m$^3$/hour or even 11,000 m$^3$/hour, the axial size of the pump reaches a value of several meters, and it is generally undesirable to increase this size further.

It has also been proposed to place two windings of different pole pitches on top of each other in each of the notches of the combs of the inductor. This solution leads to a high investment cost which is due to the complexity of the electrical supply or of actually producing the winding itself.

In GB-A-2,064,229, it was proposed, with the aim of decreasing the reactive power of an electromagnetic machine, to use a stator including two successive parts, the first having regularly spaced pole pitches, and the second having regularly spaced pole pitches, but with shorter pitches than the first. Such an arrangement does not substantially improve the efficiency of the electromagnetic machine.

Linear-induction electromagnetic machine having both high efficiency and moderate size and cost, in particular those which could operate as a pump with high power and high throughput were known.

SUMMARY OF THE INVENTION

The object of the invention is therefore to provide a linear-induction electromagnetic machine including a substantially straight tubular duct intended to receive a conducting material which can circulate in the duct, and an inductor comprising a magnetic circuit formed by magnetic sheet metal combs forming mutually parallel notches which are arranged substantially parallel to the external contour of the duct over at least part of its periphery, and are separated from each other along the axial length of the duct by parts of the inductor projecting towards the inside in the direction of the duct or radial direction, which are called teeth, one winding being arranged in each of the notches and connected to one phase of a polyphase current source, this electromagnetic machine having a high efficiency, small size and being capable of being produced at a moderate cost.

With this purpose, the teeth of the inductor which are arranged in at least one of the end parts of the inductor which are situated facing the entry and exit parts of the duct, in the direction of circulation of the conducting material, have a length in the axial direction which is generally greater than the axial length of the teeth in a central part of the inductor, situated between the end parts.

Preferably, the notches of the combs of the inductor are generally deeper in the central part of the inductor than in the end parts and enclose windings with a greater number of turns.

BRIEF DESCRIPTION OF THE DRAWINGS

In order better to explain the invention, a linear-induction electromagnetic pump according to the invention will now be described, by way of example, with reference to the appended drawings.

DETAILED DESCRIPTION

Figure 1:
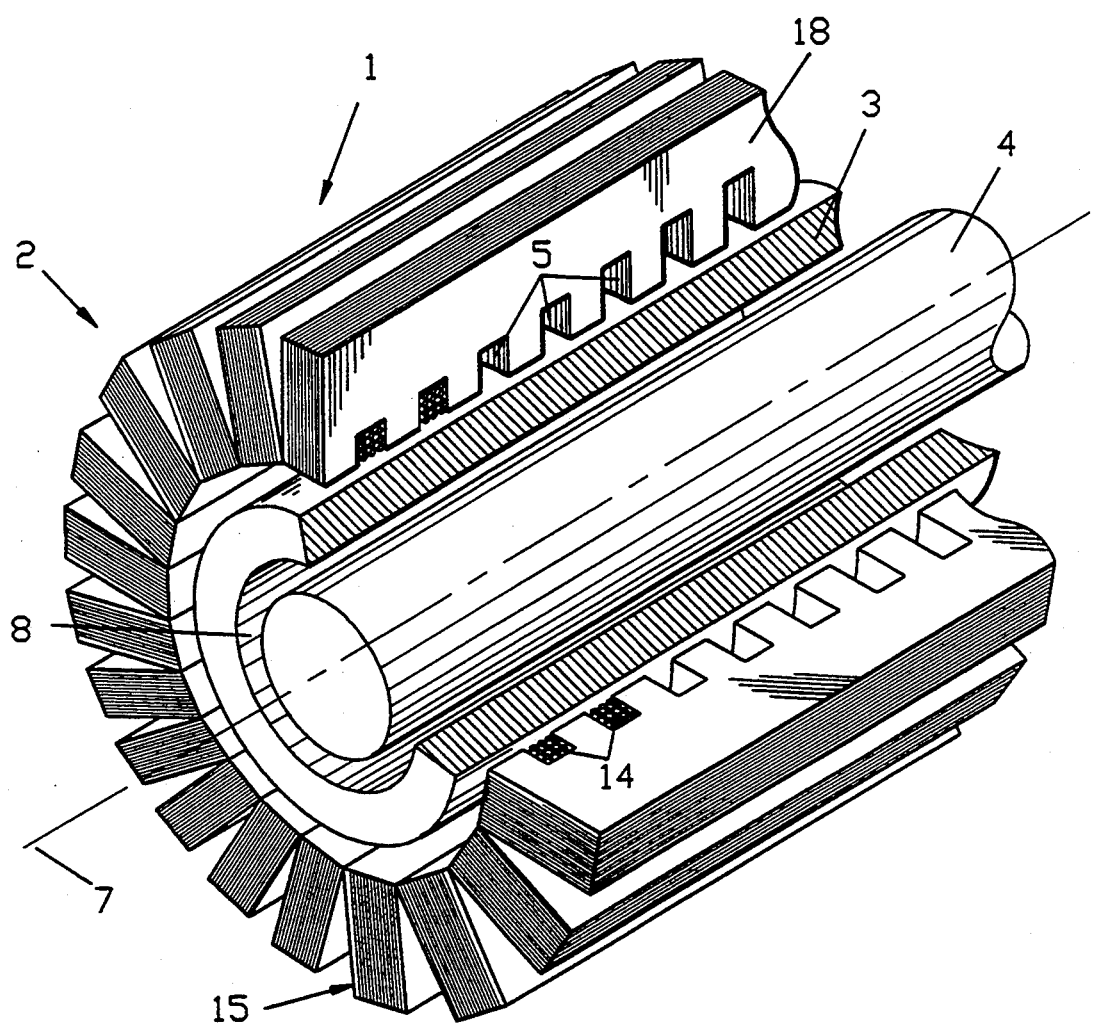
FIG. 1 is an exploded perspective view of a pump according to the invention.

FIG. 1 shows a linear-induction electromagnetic pump 1 according to the invention.

The pump 1 includes an inductor 2 which consists of a magnetic circuit 15 formed by combs 18 and windings 14 and a tubular duct 3 in a coaxial arrangement, inside the combs 18 of the inductor 2.

Furthermore, a magnetic core 4 of cylindrical shape is placed in a coaxial arrangement inside the tubular duct 3, facing the inductor 2.

Figure 2:
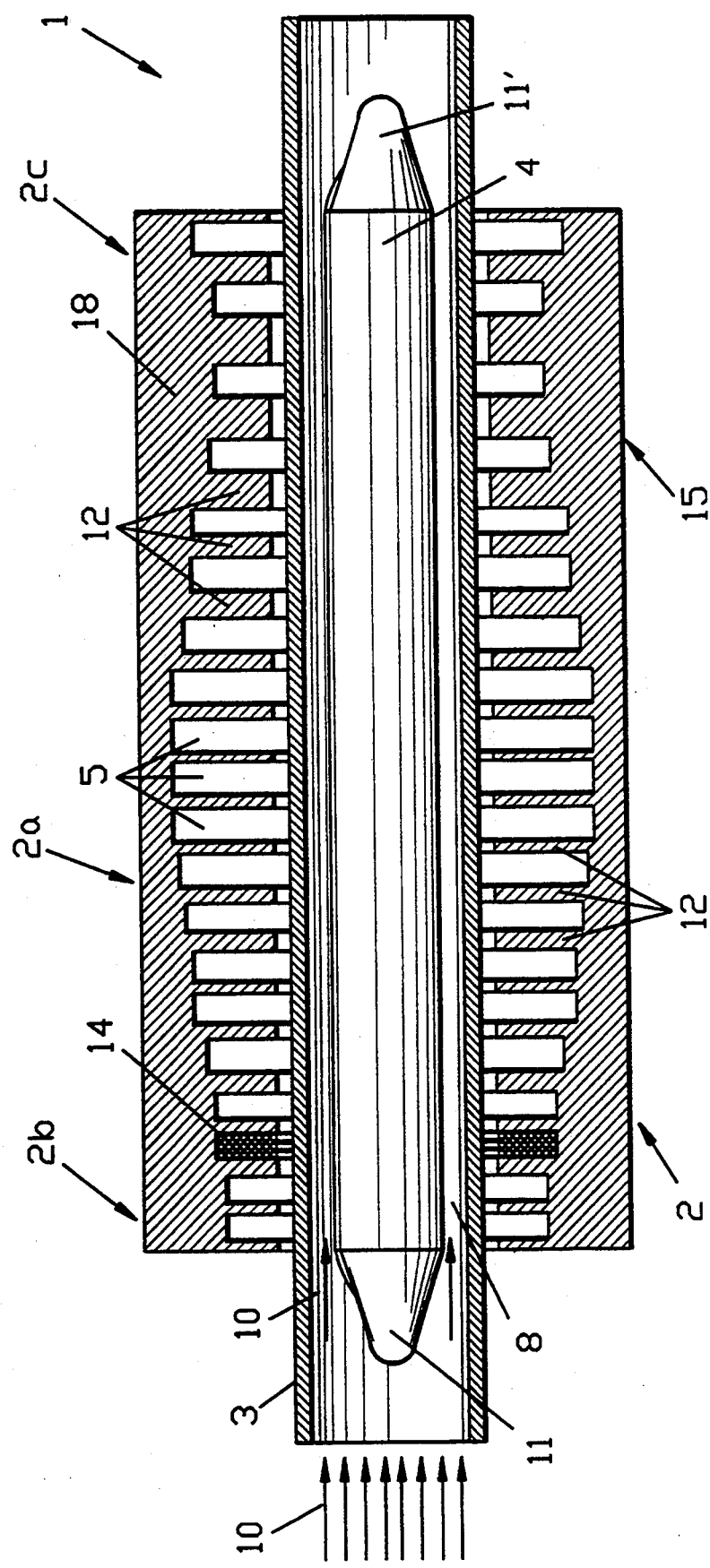
FIG. 2 is a view in section through an axial plane of the pump represented in FIG. 1.

Referring to FIGS. 1 and 2, it is seen that the laminated magnetic circuit 15 of the inductor 2 is formed by combs 18 consisting of juxtaposed of magnetic metal sheets juxtaposed in the radial direction.

Each of the metal sheets of the magnetic circuit 15 of the inductor 2 is cut out to form successive notches whose cross-section is substantially rectangular.

The cut-outs of the juxtaposed magnetic metal sheets constituting the combs 18 of the magnetic circuit 15 make it possible to form, inside the combs 18 of the inductor, notches 5 of annular shape arranged successively in the longitudinal direction of the inductor, parallel to the axis 7 of the pump which is the axis common to the tubular duct 3 and to the inductor 2.

The magnetic core 4 arranged inside the duct 3 is also made in a laminated form, by assembling, juxtaposed, plates of radial direction cut out from magnetic metal sheets.

The tubular duct 3 is fixed in a coaxial arrangement inside the inductor 2, with a small clearance in the radial direction.

An annular space 8 is formed between the inner surface of the duct 3 and the outer surface of the core 4 which is fixed in a coaxial arrangement inside the duct 3.

The conducting material circulated by the pump, schematically represented by the arrows 10 in FIG. 2, circulates in an axial direction, inside the annular space 8.

It is obvious that the duct 3 may be intercolated between a duct for conveying the conducting liquid and to an exit duct for removing the conducting liquid.

The core 4 preferably includes a smooth tubular outer casing, within which the magnetic metal sheets of the laminated structure of the core are fixed, and two substantially ogival end parts 11 and 11' allowing the effect of braking the fluid by the magnetic core 4 to be limited.

Between any two successive notches, the combs 18 of the magnetic circuit 15 of the inductor 2 include an annular part 12 projecting radially towards the inside of the inductor, i.e., that is to say in the direction of its axis 7, with respect to the base of the notches 5.

The successive projecting parts 12 separating the notches 5 will be referred to as teeth of the inductor.

An annular winding 14, including a plurality of turns which all have the axis 7 of the pump as their axis, is arranged in each of the annular notches 5.

Each of the windings 14 is connected to one phase of a polyphase alternating current source. In this way, currents flow through the turns of the windings 14 in a direction circumferential to the inductor, around the duct 3.

The successive windings 14 generate magnetic fields which are distributed along the axial direction of the pump and which are offset with respect to each other, because the windings are connected to different phases of the current source.

The force lines of the fields created are contained within the duct 3 by means of the magnetic core 4.

A field sliding in the axial direction 7 of the pump and of the inductor is thus created.

When a conducting material such as sodium penetrates into the annular space 8 of the pump, induced currents are created inside the conducting liquid by the fields of the inductor.

The combined effects of the induced currents and of the sliding field produces forces directed axially and drives the conducting material in the axial direction, as indicated by the arrows 10.

The device according to the invention, as it will be explained with reference to FIGS. 1, 2 and 3, makes it possible to produce an optimized distribution of the currents creating the magnetic field, in the axial direction of the inductor.

A substantial increase in efficiency of the pump can be obtained by virtue of the fact that the distribution of the currents is optimized, both as regards the phase distribution and the intensity distribution.

As can be seen in particular in FIG. 2, the successive teeth 12 of the inductor 2 separating the notches 5 in which the windings 14 are arranged, do not all have the same width in the axial direction.

Thus, in general, the teeth separating the notches situated at the central part 2a of the inductor 2 are shorter than the teeth situated towards the ends 2b and 2c of the inductor, which are situated facing the entry and exit parts of the duct 3. For example, the teeth situated in the end part 2c arranged on the exit side of the inductor, in the sense of circulation of the fluid given by the arrows 10, are long compared to the teeth situated in the central part 2a.

The length of the teeth in the axial direction therefore first decreases, from the entry end of the inductor as far as the central end, then increases from the central part as far as the exit end of the inductor.

The result of this is that the distances between the middle parts of the notches 5 and of the windings 14 situated in these notches corresponding to the successive pole pitches of the inductor, are substantially smaller in the central part 2a of the inductor than in the end parts 2b and 2c.

The various supply currents of the inductor which have phase shifts with respect to each other are not applied onto windings which are regularly distributed along the axial length of the inductor.

The result of this is that the phase distribution along the length of the inductor is not linear, but follows a variation law which can be adjusted by choosing the successive lengths of the teeth 12 of the inductor.

It has been possible to show that certain phase distributions of the currents and therefore of the magnetic flux along the axial length of the inductor were favorable for obtaining an optimum efficiency of the electromagnetic pump.

The windings 14 arranged in the notches 5 may be connected to the successive phases of a polyphase supply, the phase distribution along the axial direction of the inductor is then defined by the lengths of the successive teeth of the inductor, i.e., by the inter-axis distance between the notches or between the windings.

Furthermore, as can be seen in FIGS. 1 and 2, the depth of the notches 5 is not constant along the length of the inductor 2.

In general, the notches are deeper in the central part 2a of the inductor than in the end parts 2b and 2c.

The notches 5 of variable depth make it possible to accommodate windings 14 having different numbers of turns, and which can therefore create a current density which is variable along the longitudinal direction of the inductor 2.

It is thus possible to alter the distribution of the current along the longitudinal direction of the inductor 2 and to adjust this distribution of the supply currents of the inductor so as to optimize the efficiency as well as the force and the power of the electromagnetic pump, for example for a given total length of the inductor.

The electromagnetic machine according to the invention therefore has characteristics making it possible to optimize both the phase distribution and the intensity distribution of the supply currents of the inductor, along the axial direction of this inductor.

Figure 3:
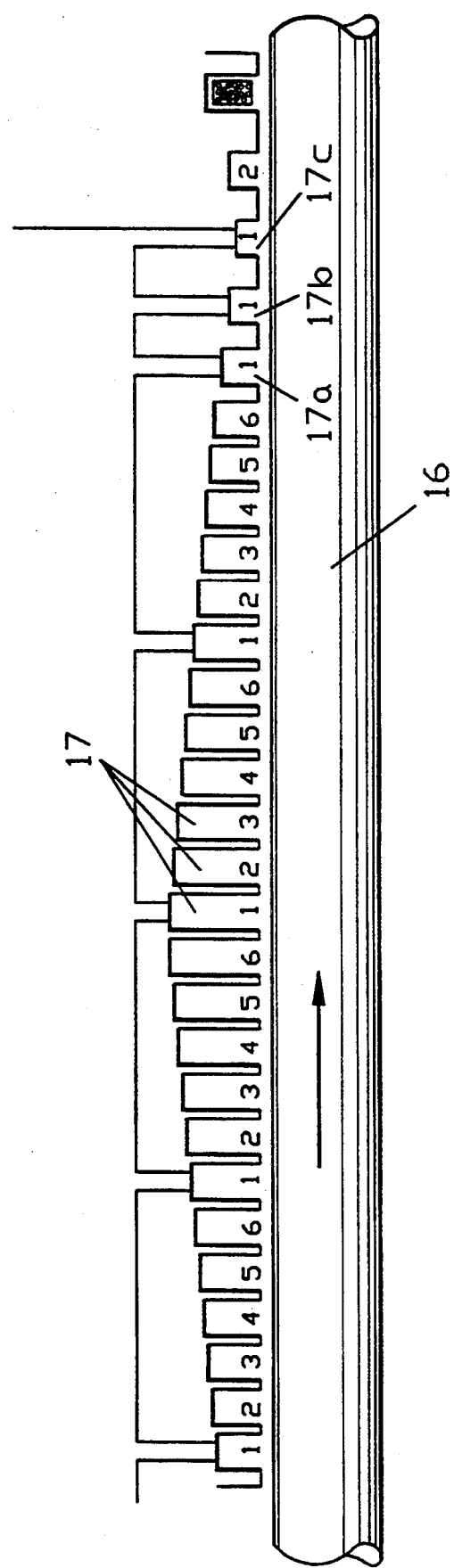
FIG. 3 is a schematic view of the pump in the longitudinal direction, showing one mode of connection of the successive windings of the inductor.

Furthermore, as represented in FIG. 3, it is possible to optimize the phase distribution, not only by changing the separation of the successive windings over the regions of the inductor in the axial direction, but also by connecting up the successive windings such that at least some of these successive windings are not connected to the successive phases of the polyphase current.

Several successive windings may preferably be connected to one and the same phase.

FIG. 3 schematically represents the tubular duct 16 and the windings 17 of the inductor of an electromagnetic pump supplied with six-phase current.

As in the case of the pump represented in FIGS. 1 and 2, the notches receiving the successive windings 17 are not regularly spaced over the entire length of the inductor, the windings situated in the exit part of the pump being generally more widely spaced than the windings situated in the other parts of the inductor. This arrangement is obtained by the cut-outs of the combs 18 of the magnetic circuit of the inductor, the teeth of which are longer towards the end corresponding to the exit of the pump.

Furthermore, as described above as regards the pump in FIGS. 1 and 2, the depth of the notches is not constant over the length of the inductor, the notches receiving the windings 17 having a depth in the radial direction which is greater in the central part of the inductor.

The windings 17 of the central part of the inductor therefore have a large number of turns and supply a greater number of amps/turn than the windings situated towards the ends of the pump.

As can be seen in FIG. 3, the number of turns of the successive windings increases regularly as far as the region situated towards the central part of the inductor, then progressively decreases until it becomes steady at a relatively small and substantially constant value in the part of the inductor corresponding to the exit end of the pump.

In FIG. 3, the phase of the six-phase supply to which each winding is connected has in addition been indicated by a number drawn on the successive windings 17.

The first four series of six windings are connected to the successive phases 1, 2, 3, 4, 5, 6 of the six-phase supply, in the order of these phases.

Following these windings which are connected sequentially to the phases of the six-phase supply, three windings 17a, 17b, 17c, which are substantially more widely spaced than the other windings 17, are connected to phase 1 of the polyphase supply.

The last winding of the inductor on the side of the exit end of the pump is connected to phase 2 of the polyphase supply.

The distribution of the phase 1 of the six-phase current has been shown by joining lines.

Phase 1 is first connected, starting from the entry end of the pump, to windings situated every six, then to three successive windings.

Because of the variable spacings of the windings 17 and the irregular sequence of connecting up the phase at the exit end of the pump, it has been possible to regulate the distribution of phase 1 of the six-phase supply on the windings of the inductor, so as to optimize the efficiency and the overall performance of the electromagnetic pump.

An electromagnetic pump according to the invention, in which the successive windings 17 are connected up in the manner represented in FIG. 3, has an efficiency slightly greater than 48%, and entirely satisfactory overall performance, without increasing the length of the inductor in comparison with known pumps of the prior art whose efficiency is less than 42%.

In the case of a pump according to the prior art, whose efficiency can be raised to a value close to 48% by adding a long end pole towards the exit of the pump, an increase in length of the inductor of the order of 20% must be accepted.

In the case of the invention, higher performance is obtained with an inductor whose length is therefore 20% less than the length of the inductor of a pump of the prior art having an additional end pole.

By using the arrangements according to the invention, for example such as represented in FIGS. 1 and 2 or in FIG. 3, it was possible to design a pump having a throughput of 600 m$^3$/hour, the length of which i.e., the length of the inductor) is 2.2 m, which compares favorably with the length of a pump according to the prior art (2.7 m).

The diameter of the duct of the pump in which the pumped conducting liquid circulates is approximately 300 mm.

It has also been possible to design a pump according to the invention having a very high throughput, of the order of 11,000 m³/h. Such a pump has a length of 5 m, and the diameter of the central tubular duct is approximately 1 m.

The electromagnetic machine according to the invention therefore has the advantage of making it possible to obtain excellent efficiency while keeping the general characteristics of the pump at a satisfactory level and without increasing the length of the inductor of the electromagnetic machine.

Furthermore, this electromagnetic machine which can, for example, be a very-high-throughput pump is produced without having to resort to a complex electrical supply intended to provide the sets of multiple windings with the supply currents.

The cost price of the pump therefore remains moderate.

According to the invention, it is thus possible to use very-high-throughput pumps to circulate a heat-exchange liquid metal, such as sodium, of a fast-neutron nuclear reactor. In this case, the secondary sodium can be circulated by using pumps according to the invention. The total power of the six pumps is then 17 MW, compared with the power of 18 MW which would be necessary when using the six pumps according to the prior art. This results in a power saving of 1 MW.

Electromagnetic machines according to the invention may have teeth of variable length which are distributed in a manner different from what has been described and notches of variable depth in the radial direction, intended to receive windings with a variable number of turns, distributed in a different manner.

The modes of connecting up the phases may differ from the mode of connection where several successive windings are connected to the same phase. The order of the phases might for example be locally reversed on several successive windings.

In general, the electromagnetic machine according to the invention may be a pump intended to circulate any electrically conducting material, such as sodium, in the secondary loops of a fast-neutron nuclear reactor or any other pump intended to circulate any conducting material, and in particular a metal such as zinc, magnesium, lead, mercury or lithium.

The electromagnetic machine according to the invention may also be used as a propulsion means in a conducting liquid such as sea waters in this case, the sea water is sucked in through an entry end of the duct of the electromagnetic machine, which is operating as a pump, and ejected through the exit end of the duct.

The electromagnetic machine according to the invention may also be produced in the form of a device for braking a flow of a conducting material, or alternatively in the form of a linear motor or of a magnetohydrodynamic generator. Or in the case of use as a linear motor, the invention may be applied in particular to the propulsion of land vehicles.

The invention may also be transposed to induction pumps or other electromagnetic machines which include a duct of flat tubular shape comprising at least two opposite plane large faces and an inductor including magnetic sheet metal combs forming straight and mutually parallel notches separated by teeth pointing towards at least one of the large plane faces of the ducts these pumps are in fact annular pumps in which the inductor has been unrolled.

We claim:

1. A linear-induction electromagnetic machine including a substantially straight tubular duct intended to receive a conducting material which can circulate axially in the duct between an entry part and an exit part of the duct and an inductor comprising a magnetic circuit formed by magnetic sheet metal combs arranged around at least a part of a periphery of the duct and forming mutually parallel notches arranged along the combs in the axial direction of the duct and separated from each other along the axial direction by teeth of the combs of the inductor projecting radially towards an inside part of the duct, at least one winding being arranged in each of the notches and connected to one phase of a polyphase current source having successive phases, said inductor comprising two end parts respectively facing the entry and the exit parts of the duct and a central part between the end parts, wherein the teeth which are arranged in at least one of the end parts of the inductor have a length in the axial direction greater than a length in the axial direction of the teeth arranged in the central part of the inductor and wherein the notches of said combs in the central part of the inductor have a depth in the radial direction greater than the depth of the notches in the end parts of the inductor and enclose windings with a greater number of turns.

2. An electromagnetic machine according to claim 1, wherein a first winding of the inductor is connected to a first phase of the polyphase current source and a second winding situated adjacent to the first winding is connected to a second phase of the current polyphase source which is not successive to the first phase.

3. An electromagnetic machine according to claim 2, wherein at least two adjacent windings of the inductor are connected to a same phase of the electrical supply current source.

4. An electromagnetic machine according to claim 3, wherein at least two adjacent windings situated at at least one of the ends of the inductor are connected to a same phase of the polyphase current source.

5. An electromagnetic machine according to any one of claims 1 to 4, wherein the tubular duct and the inductor which is of annular shape are arranged coaxially and the notches of the combs of said inductor are of annular shape and separated by teeth of annular shape pointing inwards and each enclosing an annular winding coaxial with the duct and with the inductor, said electromagnetic machine including a substantially cylindrical magnetic core placed in a coaxial arrangement inside the tubular duct.

* * * * *